(12) United States Patent
Bonzi et al.

(10) Patent No.: US 8,614,284 B2
(45) Date of Patent: Dec. 24, 2013

(54) METHODS OF PREPARING POLYMER-DENDRIMER HYBRIDS

(75) Inventors: Gwenaelle Bonzi, Betton (FR); Jonathan Weaver, Hoole (GB); Andrew Cooper, Kelsall (GB); Steven Rannard, Mickle Trafford (GB)

(73) Assignee: The University of Liverpool, Liverpool (GB)

( * ) Notice: Subject to any disclaimer, the term of this patent is extended or adjusted under 35 U.S.C. 154(b) by 0 days.

(21) Appl. No.: 12/936,358

(22) PCT Filed: Apr. 6, 2009

(86) PCT No.: PCT/GB2009/050334
§ 371 (c)(1),
(2), (4) Date: Apr. 21, 2011

(87) PCT Pub. No.: WO2009/122220
PCT Pub. Date: Oct. 8, 2009

(65) Prior Publication Data
US 2011/0201773 A1  Aug. 18, 2011

(30) Foreign Application Priority Data
Apr. 4, 2008  (GB) .................................. 0806086.5

(51) Int. Cl.
*C08F 220/26* (2006.01)
*C08F 2/00* (2006.01)

(52) U.S. Cl.
USPC ........ 526/323.2; 526/209; 526/214; 526/320; 526/323.1

(58) Field of Classification Search
None
See application file for complete search history.

(56) References Cited

U.S. PATENT DOCUMENTS 6,716,948 B1 * 4/2004 Klaerner et al. ........... 526/303.1

FOREIGN PATENT DOCUMENTS

| EP | 0 899 286 A1 | 3/1999 |
| EP | 1 006 165 A2 | 11/1999 |
| EP | 0 963 751 A1 | 12/1999 |

OTHER PUBLICATIONS

Grayson, S.M., Fréchet, J.M.J., Convergent Dendrons and Dendrimers: from Synthesis to Applications, Chem. Rev. 2001, pp. 3819-3867, vol. 101.
Tomalia, Donald A., et al., "Introduction to Dendrimers and Dendritic Polymers," Prog. Polym. Sci., 2005, pp. 217-219, vol. 30.
Zhang, Xi et al., "Self-condensing vinyl polymerization of acrylamide," Polymer Bulletin, 1999, pp. 29-34, vol. 43.
International Preliminary Report on Patentability for PCT/GB2009/050334, dated Oct. 5, 2010.
Aulenta, F., et al., "Dendrimers: a New Class of Nanoscopic Containers and Delivery Devices," 39 European Polymer Journal 1741-1771 (2003).
Bannister, I., et al., "Development of Branching in Living Radical Copolymerization of Vinyl and Divinyl Monomers," 39 Macromolecules, pp. 7483-7492 (2006).

(Continued)

*Primary Examiner* — Vu A Nguyen
(74) *Attorney, Agent, or Firm* — TraskBritt

(57) ABSTRACT

The present invention relates to a branched vinyl polymer carrying dendrons made from monofunctional vinyl monomers and branched by virtue of difunctional vinyl monomers so that there is on average one branch or fewer per polymer chain to avoid gelation. The polymer may be made by chain-growth polymerization of predominantly monofunctional vinyl monomers in the presence of difunctional vinyl monomers and dendron units.

9 Claims, 8 Drawing Sheets

(56) References Cited

OTHER PUBLICATIONS

Butun, V., et al., "Synthesis and Characterization of Branched Water-Soluble Homopolymers and Diblock Copolymers Using Group Transfer Polymerization," 38 Macromolecules, pp. 4977-4982 (2005).

Connal, Luke A., et al., "Synthesis of Dendron Functionalized Core Cross-linked Star Polymers," Macromolecules, vol. 40, No. 22, Oct. 2, 2007, pp. 7855-7863.

Frauenrath, H., "Dendronized Polymers—Building a New Bridge from Molecules to Nanoscopic Objects," 30 Prog. Polym. Sci. pp. 325-384 (2005).

Gillies, E.R., et al., "Dendrimers and Dendritic Polymers in Drug Delivery," 10 Drug Discovery Today, pp. 35-43 (2005).

He, T., et al., "Direct Synthesis of Anisotropic Polymer Nanoparticles," 46 Angew Chem. Int. Ed., pp. 9243-9247 (2007).

Isaure, Francoise, et al., "Synthesis of branched poly(methyl methacrylate)s via controlled/living polymerisations exploiting ethylene glycol dimethacrylate as branching agent," Chem. Commun., Mar. 25, 2004, pp. 1138-1139.

O'Brien, N., et al., "Facile, Versatile and Cost Effective Route to Branched Vinyl Polymers," 41 Polymer, pp. 6027-6031 (2000).

Patton, Derek, et al., "Functional dendritic chain transfer agents (CTAs): a facile approach to dendritic-linear macromolecules via RAFT polymerization," American Chemical Society, PMSE Preprints (2006), 94, pp. 337-338.

Rannard, S. P., et al., "A Highly Selective, One-Pot Multiple-Addition Convergent Synthesis of Polycarbonate Dendrimers," 122 J. Am. Chem. Soc., pp. 11729-11730 (2000).

Zhao, You-Liang, et al., "Atom Transfer Radical Copolymerization of N-Phenylmaleimide and Styrene Initiated with Dendritic Polyarylether 2-Bromoisobutyrate," Journal of Polymer Science, Part A, Polymer Chemistry, vol. 39, No. 22, 2001, pp. 3960-3966.

PCT International Search Report, International Application No. PCT/GB2009/050334, mailed Jul. 15, 2009, three (3) pages.

Search Report under Section 17, U.K. Intellectual Property Office, Application No. GB0806086.5, Jun. 27, 2008, one (1) page.

Written Opinion of the International Searching Authority, International Application No. PCT/GB2009/050334, Jul. 15, 2009, five (5) pages.

\* cited by examiner

METHODS OF PREPARING POLYMER-DENDRIMER HYBRIDS

CROSS-REFERENCE TO RELATED APPLICATIONS

This is a national phase entry under 35 U.S.C. §371 of International Patent Application No. PCT/GB2009/050334, filed Apr. 6, 2009, published in English as International Patent Publication No. WO 2009/122220 A1 on Oct. 8, 2009, which claims the benefit of Application No. GB 0806086.5, filed on Apr. 4, 2008.

TECHNICAL FIELD

The present invention relates to a branched vinyl polymer-dendrimer hybrid product (eg a branched vinyl polymer carrying dendrons) and to a method of preparation thereof.

BACKGROUND

Dendrimers are repeatedly branched chemical structures. A review by S. M. Grayson and J. M. J. Frechet, Chem. Rev. 2001, 101, 3819-3867 defines conventional dendrimers as "highly ordered, regularly branched, globular macromolecules prepared by a stepwise iterative approach". H. Frauenrath, Prog. Polym. Sci. 2005, 30, 325-384 contains the following definition of conventionally prepared dendrimers: "Dendrimers comprise a monodisperse, low molecular weight, multifunctional core unit to which a defined number of dendrons are attached, i.e. monodisperse, branched, oligomeric segments consisting of repeating units with an $AB_m$ type functional group pattern and a degree of branching of 100%".

The first dendrimers were synthesized about 30 years ago by divergent growth, namely by initiating growth at what becomes the core of the polymer and repeatedly coupling and activating to sequentially branch outwards. The convergent approach developed subsequently initiates growth from what eventually becomes the exterior of the molecule. The concept of a "dendron" is relevant in the convergent approach. This can be clearly understood from the above-mentioned reviews by Frauenrath and Grayson (and elsewhere) which explain that a dendron is a "wedge-shaped dendritic fragment". In the convergent approach, dendrons are synthesized so that they have a functional group at their focal point. Such functional groups are also known as chemically addressable groups and several dendrons (for example three dendrons) are joined together at their focal points and together become the centre of the resultant dendrimer.

By way of analogy, the divergent approach resembles the natural growth of branches on a tree and the convergent approach resembles the preparation of separate branches (dendrons) followed by coupling of the branches.

Dendritic materials have numerous current and potential uses in the chemical, life science, biotechnology and nanotechnology fields as described (for example) in the above-mentioned reviews by Grayson and Frechet and by Frauenrath and also in F. Aulenta, W. Hayes and S. Rannard, European Polymer Journal 2003, 39, 1741-1771 and E. R. Gillies and J. M. J. Frechet, Drug Discovery Today 2005, 10, 1, 35-43. Applications include (for example) delivery devices including drug delivery systems, nanoscopic container molecules, conjugate delivery systems, boron neutron capture therapy, molecular recognition, nanoscopic building blocks, nanoparticles, functionalized or functionalizable materials, optoelectronic uses, single molecule reactions and surface patterning. Some applications exploit the large number of groups of controllable chemistry on the surface of the molecule. Other uses exploit differential properties (for example hydrophobicity and hydrophilicity) between the inside and outside of the dendrimer.

Historically the synthesis of branched polymers with controlled architecture, functionality and size has been demonstrated by the production of so-called ideal dendrimers. However, the production of ideally branched materials requires lengthy procedures and multiple repeated steps of synthesis, purification and characterization. The benefits of the synthesis are often shown in the number and control of the placement of functional groups at the periphery of the molecule. However the synthesis of ideal, regular dendrimer structures is arduous.

Divergent syntheses of dendrimers suffer from the need to react increasing numbers of surface functional groups on each growing molecule to form the next generation of the polymer. Maintaining 100% reaction of all of the available surface groups at each stage of growth is essential for perfect branching and therefore generates complexity within the experimental procedures. Convergent syntheses may overcome the difficulty of exponentially increasing numbers of reactions for each generation by limiting to the coupling of two (or more) wedges. However as the wedges increase in size, steric factors hinder coupling and often make it unsuccessful.

Neither divergent nor convergent methods are practically acceptable for achieving molecular sizes greater than 10 nm (especially in significant quantities).

In the preparation of a vinyl copolymer, L. A. Connal, R. Vestberg, C. J. Hawker and G. G. Qiao, Macromolecules 2007, 40, 7855-7863 disclose a first step of polymerization of a monofunctional vinyl unit (styrene) followed by isolation and purification. This is followed by a separate step of polymerization of a difunctional vinyl unit (divinyl benzene) which necessarily causes gelling and cross-linking.

BRIEF DESCRIPTION OF THE DRAWINGS

The present invention will now be described by way of non-limiting Examples with reference to the following drawings in which.

DETAILED DESCRIPTION

The present invention seeks to overcome certain drawbacks associated with conventional dendritic materials by avoiding a complex architecturally pure internal dendrimer structure but still providing a large number of judiciously placed surface functional groups.

Viewed from a first aspect the present invention provides a branched vinyl polymer carrying dendrons, wherein the vinyl polymer is made from (eg is composed of or comprises) a monofunctional vinyl monomer and is branched by virtue of a difunctional vinyl monomer so that there is on average one branch or fewer per vinyl polymer chain thereby avoiding gelation of the polymer.

By virtue of judicious selection or control of the length of the vinyl polymer chains, the type and properties (eg solubility) of the vinyl monomers, the surface chemistry of the dendrons, the amount of dendrons per vinyl polymer chain and the extent of branching, the branched vinyl polymers of the invention are facile and offer flexibility. The branched vinyl polymers of the invention are characterized by units with a large number of external surface dendron groups in which the vinyl branched polymer scaffold is often present predominantly in the centre of the unit. The non-gelled and soluble products of the present invention are different to materials disclosed in the prior art (for example in L. A. Connal, R Vestberg, C. J. Hawker and G. G. Qiao, Macromolecules 2007, 40, 7855-7863) which comprise multiple cross-linking in a gelled network.

Typically the branched vinyl polymer of the invention comprises vinyl polymer chains assembled into a vinyl polymer scaffold by one branch or fewer per vinyl polymer chain. The branches are typically distributed throughout the vinyl polymer scaffold (rather than discretely in block polymerized monofunctional vinyl monomers and difunctional vinyl monomers).

Vinyl polymer scaffolds with controlled levels of branching which characterize the present invention may be prepared by deploying various steps. Suitable steps are described generally in N. O'Brien, A. McKee, D. C. Sherrington, A. T. Slark and A. Titterton, Polymer 2000, 41, 6027-6031 and utilize a monofunctional vinyl monomer, a difunctional (di)vinyl and balancing levels of a chain transfer agent. Further suitable steps for making a branched vinyl polymer scaffold are described generally in for example T. He, D. J. Adams, M. F. Butler, C. T. Yeoh, A. I. Cooper and S. P. Rannard, Angew Chem. Int. Ed. 2007, 46, 9243-9247; V. Bütün, I. Bannister, N. C. Billingham, D. C. Sherrington and S. P. Armes, Macromolecules 2005, 38, 4977-4982; and I. Bannister, N. C. Billingham, S. P. Armes, S. P. Rannard and P. Findlay, Macromolecules 2006, 39, 7483-7492.

Figure 1:
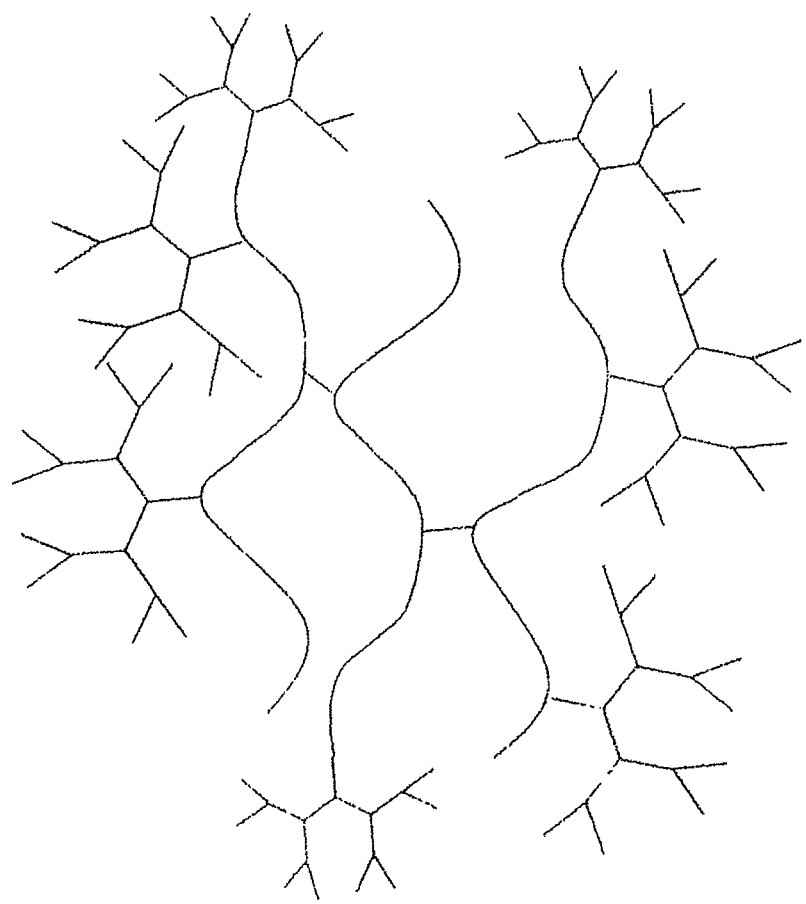
FIG. 1 is a schematic illustration of a dendron-carrying vinyl polymer of the present invention obtainable when an initiator or a chain transfer agent comprises a dendron unit and a vinyl monomer carries a dendron unit.
Figure 2:
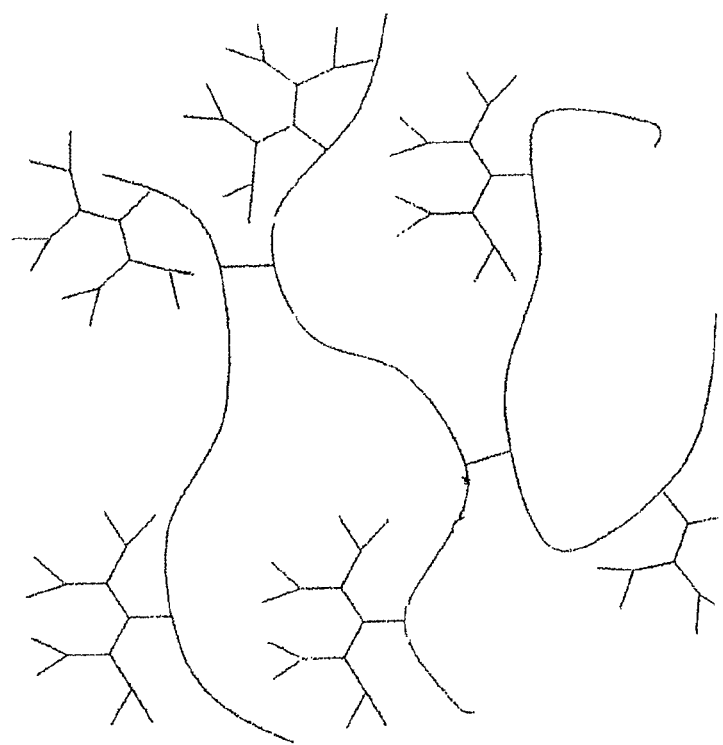
FIG. 2 is a schematic illustration of a dendron-carrying vinyl polymer of the present invention obtainable when a vinyl monomer carries a dendron unit.
Figure 3:
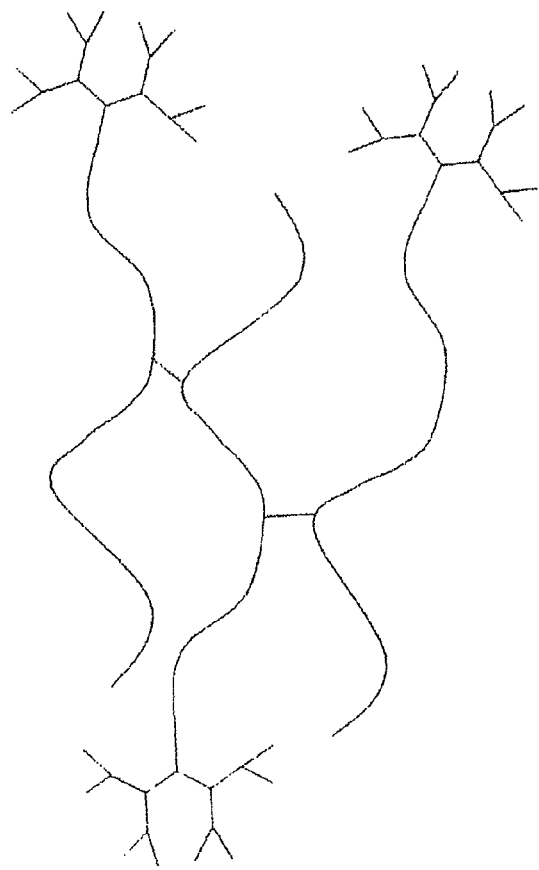
FIG. 3 is a schematic illustration of a dendron-carrying vinyl polymer of the present invention obtainable when an initiator or a chain transfer agent comprises a dendron unit.

Preferably the branched vinyl polymer is represented by the formula of FIG. 1, 2 or 3.

In a preferred embodiment, the dendrons are present predominantly at the ends of the vinyl polymer chains. Particularly preferably the branched vinyl polymer is represented by the formula of FIG. 3.

In a preferred embodiment, the dendrons are present predominantly as pendant groups on the vinyl polymer chains. Particularly preferably the branched vinyl polymer is represented by the formula of FIG. 2.

In a preferred embodiment, the dendrons are present at the ends of the vinyl polymer chains and as pendant groups on the vinyl polymer chains. Particularly preferably the branched vinyl polymer is represented by the formula of FIG. 1.

Each branch may be a glycol diester branch.

Viewed from a further aspect the present invention provides a method of preparing a non-gelled branched vinyl polymer carrying dendrons comprising: chain-growth polymerization of a predominant amount of a monofunctional vinyl monomer in the presence of a difunctional vinyl monomer and dendron units.

The manner in which branching is achieved in the method of the present invention is advantageous over the attachment of dendrons to a single chain because it allows the production of soluble, less viscous structures which are optionally approximately spherical and to which may be attached a large number of dendrons. The method advantageously avoids arduous divergent syntheses and the steric hindrance which besets convergent syntheses.

The difunctional vinyl monomer acts as a brancher (or branching agent) and provides a branch between adjacent vinyl polymer chains.

The monofunctional vinyl monomer may have one or two vinyl groups. The monofunctional vinyl monomer may have one or more pendant dendron units. The difunctional vinyl monomer may have two or more vinyl groups.

Preferably the monofunctional vinyl monomer is a methacrylate monomer, particularly preferably 2-hydroxypropyl methacrylate (HPMA) or n-butyl methacrylate. HPMA is typically available or synthesized as a mixture of (predominantly) 2-hydroxypropyl methacrylate and 2-hydroxyisopropyl methacrylate.

Preferably the difunctional vinyl monomer is a dimethacrylate monomer, particularly preferably ethyleneglycol dimethacrylate.

Preferably the amount of difunctional vinyl monomer relative to monofunctional vinyl monomer is 2 mol % or less, preferably 1.6 mol % or less.

In a preferred embodiment, the method is a one-pot method. In this embodiment, the reaction of monofunctional vinyl monomer, difunctional vinyl monomer and dendron units is carried out conveniently and cost-effectively.

Preferably the method comprises:

preparing a mixture of the monofunctional vinyl monomer and difunctional vinyl polymer;

adding dendron units to the mixture.

The mixture may contain a catalyst (such as CuCl). The mixture may contain a ligand (such as 2,2'-bipyridine).

Preferably the mixture contains an initiator.

Preferably the mixture contains a chain transfer agent.

Dendron units may be present in (eg carried on) the monofunctional vinyl monomer or difunctional vinyl monomer. Preferably the dendron units are present in the monofunctional vinyl monomer.

Preferably dendron units are present in a chain transfer agent. For example, the chain transfer agent may be a dendron unit. The dendron unit may have a thiol group as its focal point. Vinyl polymerization may occur from the thiol group. Using the chain transfer agent rather than an initiator as the dendron unit may result in a less ordered structure but requires less stringent synthesis and produces useful products. Controlled branching may be achieved by using the chain transfer agent in an amount which is the same or higher than the amount of branching agent.

Preferably dendron units are present in an initiator. For example, the initiator may be a dendron unit. The dendron unit may have a bromide as its focal point. Vinyl polymer chains extend from the focal point and are linked together by an average of one branch or fewer.

The molar ratio of difunctional vinyl monomer relative to initiator is typically 1:1 or less.

Typically the initiator is an ATRP initiator. In a preferred embodiment, the initiator is a haloisobutyrate ester, particularly preferably a bromoisobutyrate ester.

Preferably the initiator is a bromoisobutyrate ester of a disubstituted carbinol. Particularly preferably the disubstituted carbinol is an alkyl or aryl disubstituted carbinol. The aryl disubstituted carbinol may be disubstituted by benzoxyalkyl groups.

Alternatively preferably the initiator is a bromoisobutyrate ester of a 1-[N,N-bis-substituted amino]-2-propanol. Particularly preferably the 1-[N,N-bis-substituted amino]-2-propanol is N,N-substituted by anhydride groups. Each anhydride group may be a diisobutylmethanoic carboxylic anhydride group.

Preferably the initiator is selected from the group consisting of:

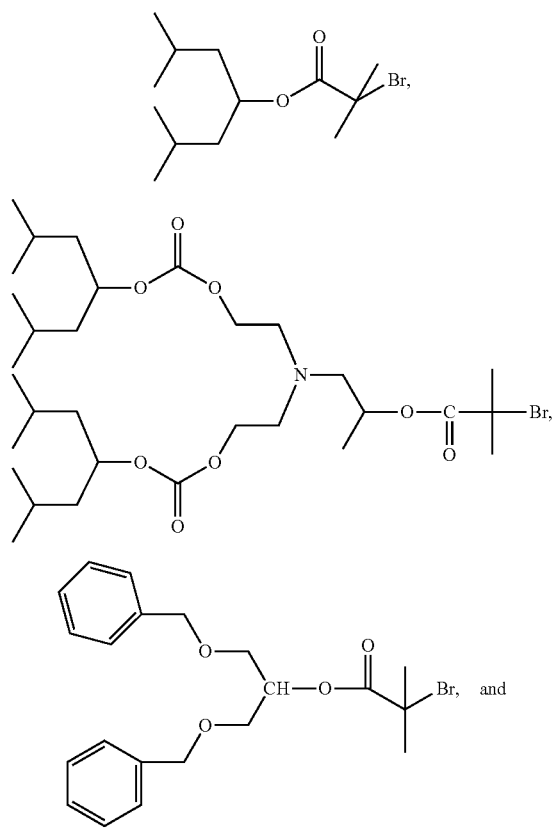

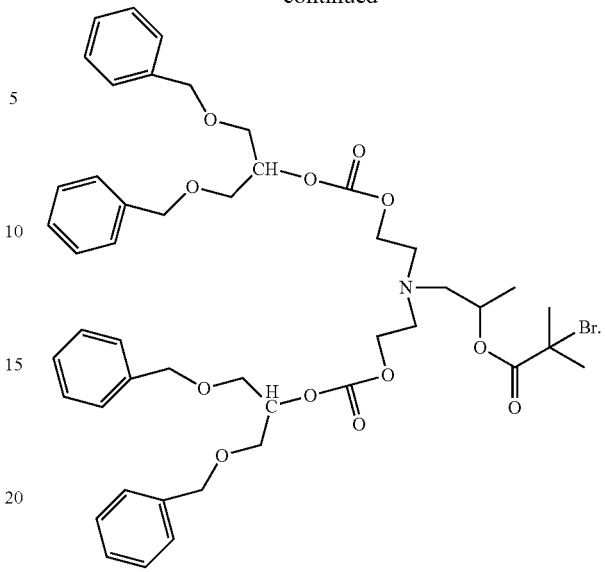

Particularly preferably the initiator is

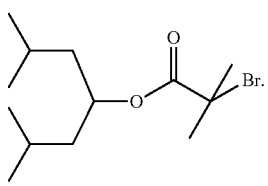 [SMILES: CC(C)CC(CC(C)C)OC(=O)C(C)(C)Br]

In a preferred embodiment, the dendron units are present solely in the monofunctional vinyl monomer.

In a preferred embodiment, the dendron units are present in the initiator (or chain transfer agent) and in the monofunctional vinyl monomer.

In a preferred embodiment, the dendron units are present solely in the initiator (or chain transfer agent).

Chain-growth polymerization in the method of the invention may be effected using conventional free radical steps or by more controlled steps such as those deployed in Atom Transfer Radical Polymerization (ATRP). ATRP is preferred where control is required such as (for example) to make materials suitable for drug delivery applications. In other applications, less controlled steps are preferred due to greater commercial viability and simpler synthesis. Chain-growth polymerization may also be effected by steps which are typically deployed in Nitroxide Mediated Polymerization (NMP) or Reversible Addition Fragmentation Chain Transfer Polymerization (RAFT).

In a preferred embodiment, chain-growth polymerization is effected by Atom Transfer Radical Polymerization (ATRP).

Viewed from a yet further aspect the present invention provides a branched vinyl polymer-dendrimer hybrid product obtainable by a method as hereinbefore defined.

FIG. 1 is a schematic illustration of a dendron-carrying vinyl polymer with seven dendrons, three vinyl polymer chains and two branches. FIG. 2 is a schematic illustration of a dendron-carrying vinyl polymer with six dendrons, three vinyl polymer chains and two branches. FIG. 3 is a schematic illustration of a dendron-carrying vinyl polymer with three dendrons, three vinyl polymer chains and two branches. These diagrams are schematic only and in reality many of the products obtainable by the present method are much larger (ie with more dendrons and more extensive vinyl polymer scaffolds).

EXAMPLES

A range of structures using dendron units of generation 0, 1 and 2 with different functional groups have been prepared. In some examples, the branched vinyl polymer scaffold is based predominantly on n-butyl methacrylate or 2-hydroxypropyl methacrylate (as monofunctional vinyl monomer) and ethyleneglycol dimethacrylate (as difunctional vinyl monomer).

Dendron units for use in the present invention may be made as described (for example) in S. P. Rannard and N. J. Davies, J. Am. Chem. Soc. 2000, 122, 11729-11730.

Using the polymerization technique ATRP, the degree of polymerization can be controlled to achieve 30-70 monomer repeat units with varying branch density. The materials have been characterized by NMR, GPC and light scattering techniques.

Examples 1 and 2 describe respectively the synthesis of 2-(N-morpholino) ethyl-2-bromoisobutyrate (a non dendron-based initiator) and dendron-based initiators derived from diisobutylcarbinol and 1-[N,N-Bis(2-hydroxyethyl)-amino]-2-propanol. These were extended via vinyl polymerization. The non dendron-based initiator 2-(N-morpholino) ethyl-2-bromoisobutyrate was used to form a branched homopolymer. The dendron-based initiators were used to synthesize a branched vinyl polymer-dendrimer hybrid product.

Example 1

Figure 4:
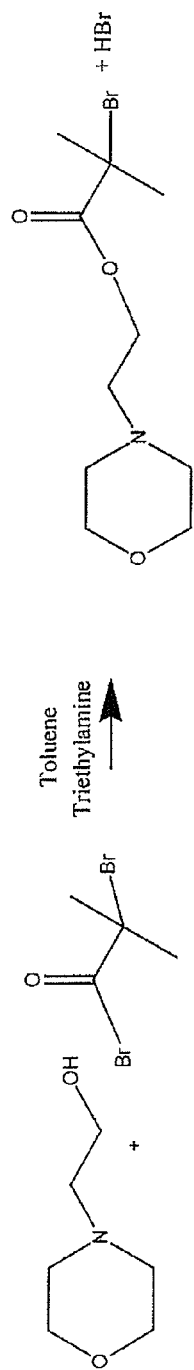
FIG. 4 illustrates the synthesis of a non-dendron based initiator 2-(N-morpholino) ethyl-2-bromoisobutyrate.
Figure 5:
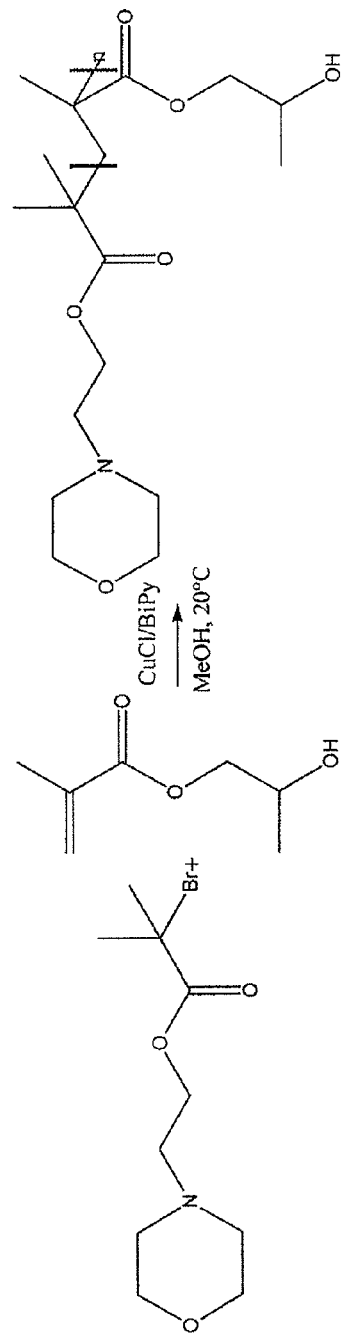
FIG. 5 illustrates the linear polymerization of hydroxypropylmethacrylate (HPMA) by ATRP onto the initiator shown in FIG. 4.

Synthesis of
2-(N-morpholino)ethyl-2-bromoisobutyrate (shown in FIG. 4)

4-(2-hydroxyethyl)morpholine (9.36 g, 71.4 mmol), triethylamine (16.25 g, 107.1 mmol) and toluene (250 ml) were added together in a round bottom flask immersed in a dry ice bath. 2-bromoisobutyryl bromide was added drop by drop to the reaction mixture with stirring. The reaction mixture was left 24 h whilst stirring and nitrogen. After filtration, the product of the reaction was washed with saturated bicarbonate solution and water using a separating funnel. The organic phase was dried with magnesium sulphate. The resulting mixture was passed through a basic alumina column to remove traces of 2-bromoisobutyryl bromide. The initiator was recovered as a yellow oil after removal of solvent by rotary evaporation.

Figure 6:
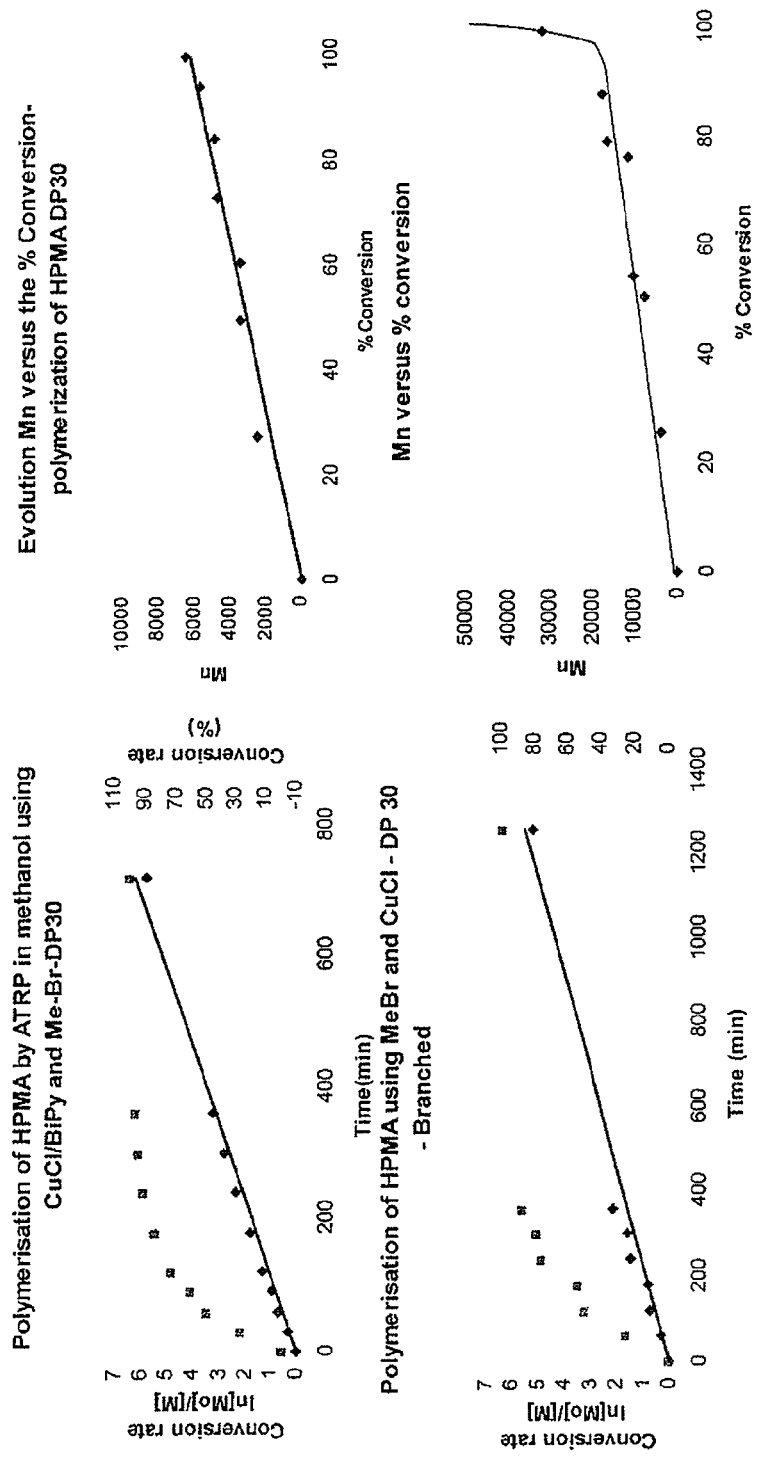
FIG. 6 shows kinetic-time plots from $^1$H NMR to monitor molecular weight growth and Mn-% conversion from GPC starting from the initiator shown in FIG. 4 for linear polymerization (upper diagrams) and branched polymerization (lower diagrams)

With reference to FIG. 6, the one-pot polymerization of HPMA by ATRP using the morpholino terminated initiator was successful. The reaction was proven to be first order and polydispersities were of low values (1.09 for the linear version and 2.78 for the branched version).

Example 2

Figure 7:
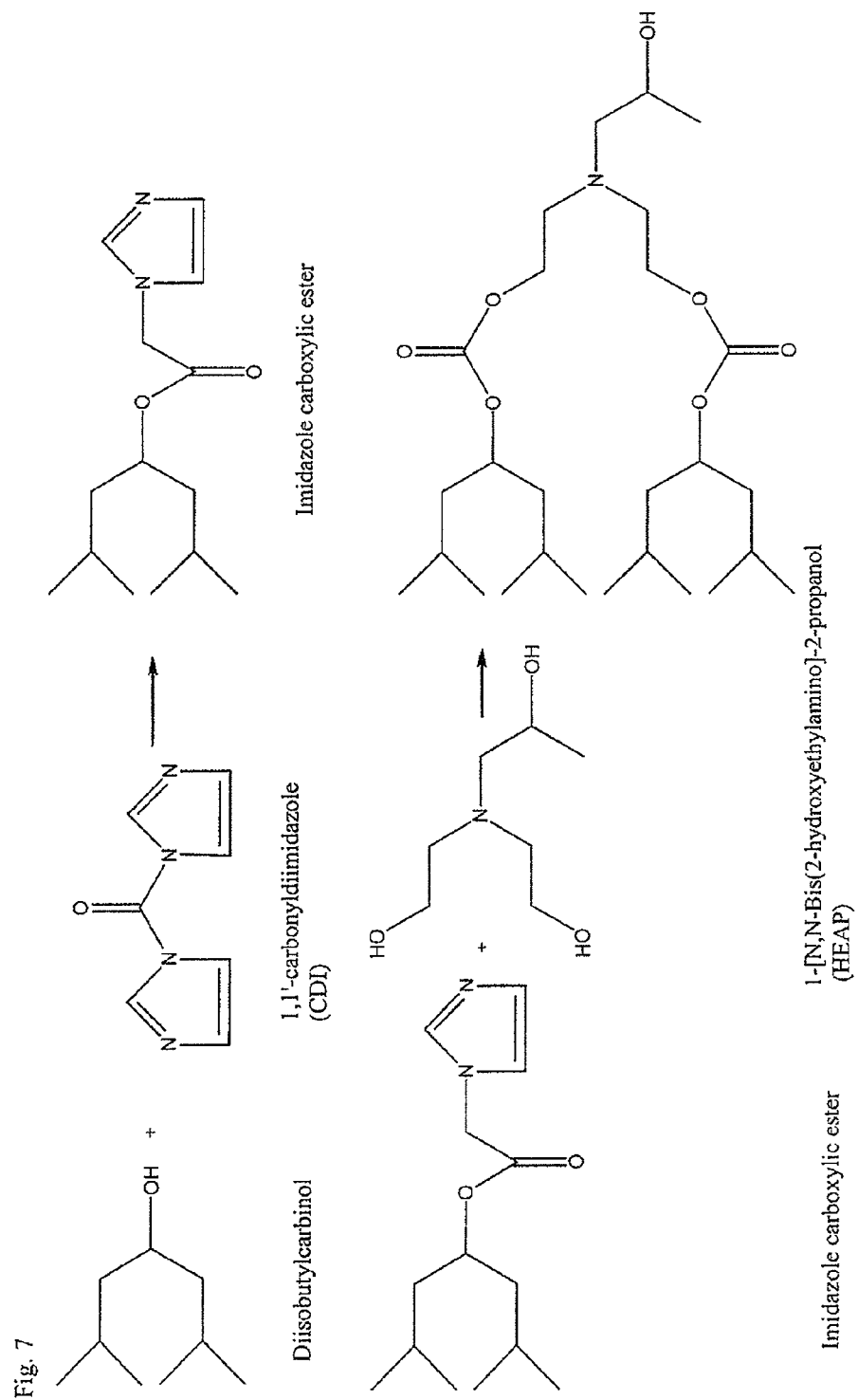
FIG. 7 illustrates the synthesis of a hydroxy-terminated dendron unit (referred to in Example 2 below)
Figure 8:
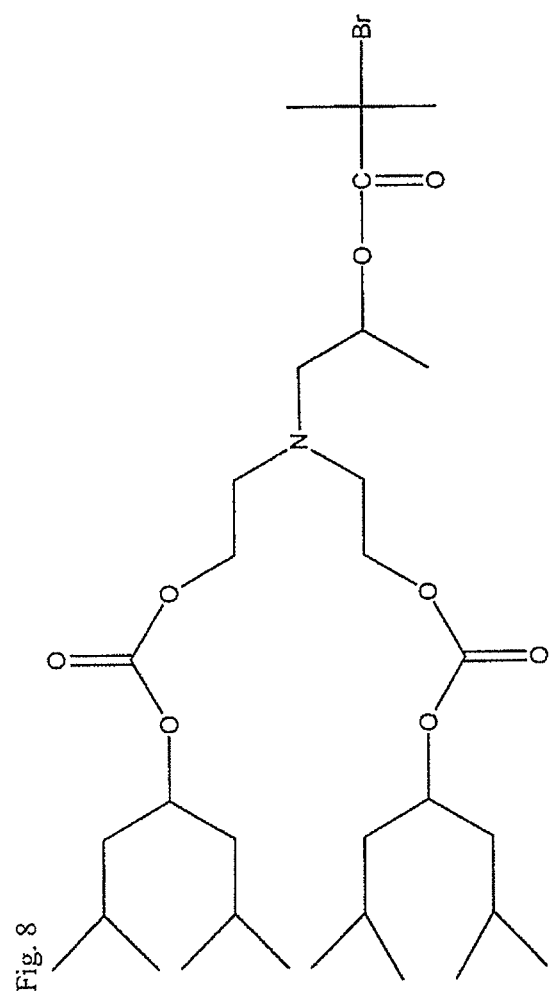
FIG. 8 illustrates the bromo-terminated dendron-based initiator derived from the product in FIG. 7 in a further step (referred to in Example 2 below)

Synthesis of Dendrimer Based Initiators (FIGS. 7 and 8)

Dry toluene (100 ml, HPLC grade) was added to a 250 ml round bottom flask fitted with an $N_2$ inlet and a magnetic stirrer. Carbonyl diimidazole (CDI, 80 mmol) and KOH (60 mmol) were added to the flask. Diisobutylcarbinol was added dropwise (70 mmol) once the mixture reached 60° C. The reaction was heated and stirred at 60° C. for 6 hours. The mixture was heated at 60° C. 1-(N,N-Bis(2-hydroxyethyl)-amino-2-propanol (35 mmol) was added dropwise. The reaction mixture was left at 60° C. under $N_2$ for 48 hours until complete carbonate formation was determined by TLC techniques. The organic phase was washed three times with water (3×100 mL) and dried over $MgSO_4$ followed by solvent removal by rotary evaporation. An OH-functional dendron unit was obtained as a colourless oil and dried in a vacuum oven (see FIG. 7).

Dry toluene (50 ml, HPLC grade) was added to a 250 ml round bottom flask fitted with an $N_2$ inlet and a magnetic stirrer. Carbonyl diimidazole (CDI, 20 mmol) was then added to the flask. The mixture was heated at 60° C. 2-methyl-2-bromo-propionic acid (22 mmol) was added dropwise until $CO_2$ evolution had ceased. The solution was heated for further 30 min and stirred at 60° C. The OH-functional dendron (20 mmol) was added to the solution and left to stir for a further 48 h. The organic phase was washed three times with water (3×100 mL), dried over $MgSO_4$ and treated with a rotary evaporator to remove solvent. The organic phase was purified by column chromatography using the solvent mixture cyclohexane/ethylacetate (80/20% vol). A yellow oil was obtained which was dried using a vacuum oven.

Figure 9:
FIG. 9 is a schematic representation of the dendron derived from the dendron-based initiator of FIG. 8 at the end of a vinyl polymer chain.
Figure 10:
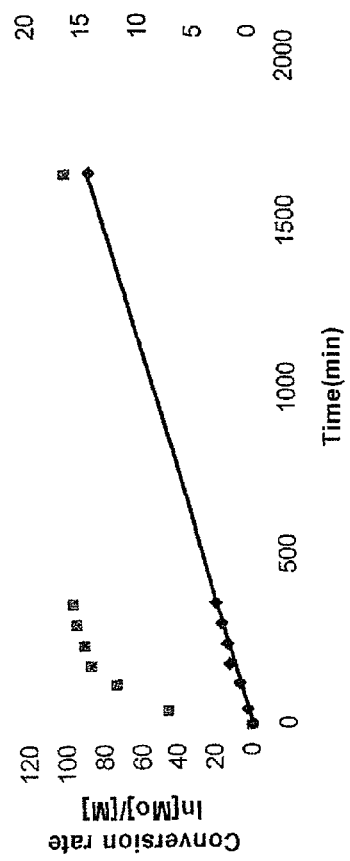
FIG. 10 shows data analogous to that in FIG. 6 for the dendron-based initiator of FIG. 8.

With reference to FIG. 10, the one-pot linear polymerization of HPMA by ATRP using the dendron-based initiator shown in FIG. 8 was successful. The product is shown schematically in FIG. 9. The reaction was proven to be first order and polydispersities were of low values (1.1).

Example 3

Branched Polymerization

Branched polymerization was carried out using previously reported ATRP techniques (T. He, D. J. Adams, M. F. Butler, C. T. Yeoh, A. I. Cooper, S. P. Rannard, *Angew. Chem. Int. Ed.* 2007, 46, 9243-9247; and V. Bütün, I. Bannister, N. C. Billingham, D. C. Sherrington, S. P. Armes, *Macromolecules* 2005, 38, 4977).

Synthesis of Branched PolyHPMA with a Dendron-Based Initiator

CuCl-dendron-based initiator (from example 2)-DP50 (degree of polymerization:50)

The branched vinyl polymer was obtained by copolymerization of the brancher ethylene glycol dimethacrylate (EGDMA) with HPMA. The ratio of brancher/initiator was 1:1.

In a typical experiment, copper chloride (0.071 g), bipyridine (0.017 moles, 0.279 g), HPMA (5.15 g), EGDMA (0.209 ml) and 6 ml methanol (HPLC grade) were added together at room temperature in a Schlenk. The reaction mixture was placed under nitrogen with magnetic stirring. The Schlenk was sealed with a rubber stopper and degassed by a flow of nitrogen. At the same time, dendron-based initiator (from example 2) was degassed under nitrogen for 30 min in a separate sealed flask. After 30 min, the dendron-based initiator (0.464 g) was added drop by drop via syringe in the reaction mixture in the sealed Schlenk. After full consumption of monomer, the polymer was purified. The methanol was removed by rotary evaporation and catalyst residues were removed by filtration through a column of neutral alumina. The polymer was extracted by precipitation in cold hexane.

Analysis

The polymer (0.5 ml) was sampled at suitable time periods throughout the reaction. The kinetics of polymerization were analysed using different analytical techniques as follows.

¹H Nuclear Magnetic Resonance (NMR): The conversion rate of polymerization was determined by proton ¹H NMR. ¹H NMR spectra were recorded on a Bruker AC400 spectrometer in deuterated chloroform $CDCl_3$ in the range 0 to 10 ppm. Anisole was used as reference and added at time $t_0=0$ min in the reaction mixture.

Gel Permeation Chromatography (GPC): Molecular weight distribution was measured by GPC at 40° C. using tetrahydrofuran (THF) as eluant at 1 ml/min. The calibration of the GPC was calibrated with narrow polystyrene standards from 580 to 7 500 000 $g \cdot mol^{-1}$ Mw.

Example 4

Aliphatic and Aromatic Dendron-Based Initiators

Copolymer HPMA-EGDMA DP50—Experimental Method

Manipulations were performed using a standard Schlenk under nitrogen. Catalyst (copper chloride—0.71 mmol, 0.071 g), ligand (2,2'-bipyridine—1.7 mmol, 0.464 g), monomer (HPMA-36.1 mmol, 5 ml), brancher (EGDMA—see below for quantities) and half the volume of needed solvent (2.5 ml) were added together. The temperature was controlled using an oil bath at 20 C. The reaction mixture was placed under magnetic stirring. The Schlenk was sealed with a rubber stopper and degassed by applying a flow of nitrogen inside the solution. In another flask, a synthesized dendron-based initiator (see below for quantities) was degassed in half the volume of solvent needed. After 30 min, the initiator solution was added drop by drop via a double ended needle in the reaction mixture. The time t=0 min was then recorded after addition of the totality of the initiator and was used as reference for the kinetic studies. The polymerization was stopped by addition of a large quantity of THF in the reaction mixture. Catalyst residues were removed by filtration through a column of neutral alumina. PolyHPMA was extracted by precipitation in cold hexane to give a white polymer.

| Initiator | | Quantity | Ratio Initiator/Brancher | Quantity EGDMA |
|---|---|---|---|---|
| Small aliphatic | 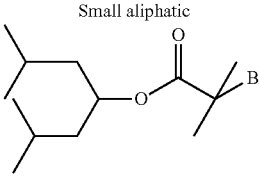 | 0.72 mmol 0.207 g | 1:0.8 | 0.58 mmol 0.109 ml |
| 1st generation aliphatic | 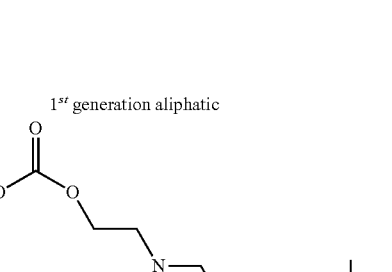 | 0.72 mmol 0.467 g | 1:0.7 | 0.50 mmol 0.095 ml |
| Small aromatic | 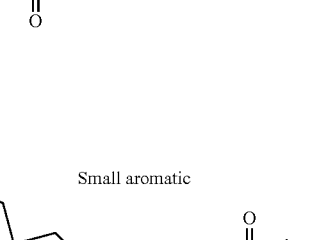 | 0.72 mmol 0.302 g | 1:0.8 | 0.58 mmol 0.109 ml |

-continued

| Initiator | Quantity | Ratio Initiator/Brancher | Quantity EGDMA |
|---|---|---|---|
| 1st generation aromatic | 0.72 mmol 0.649 g | 1:0.7 | 0.50 mmol 0.095 ml |

Polymerization Data—Small Aliphatic Initiator

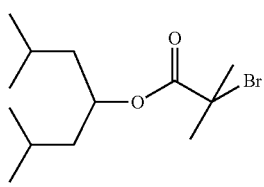 [SMILES: CC(C)CC(CC(C)C)OC(=O)C(C)(C)Br]

Mn=35,000; Mw=133,000 PDI=3.8

Polymerization Data—Small Aromatic Initiator

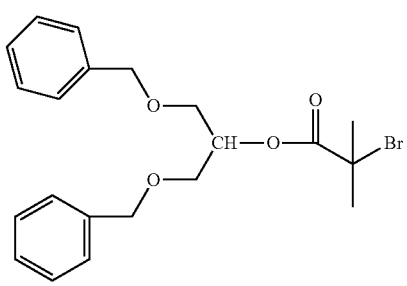 [SMILES: CC(C)(Br)C(=O)OC(COCc1ccccc1)COCc1ccccc1]

Mn=33,800; Mw=142,000 PDI=4.1

Copolymer Experimental Data—First Generation Aromatic Dendron Initiator

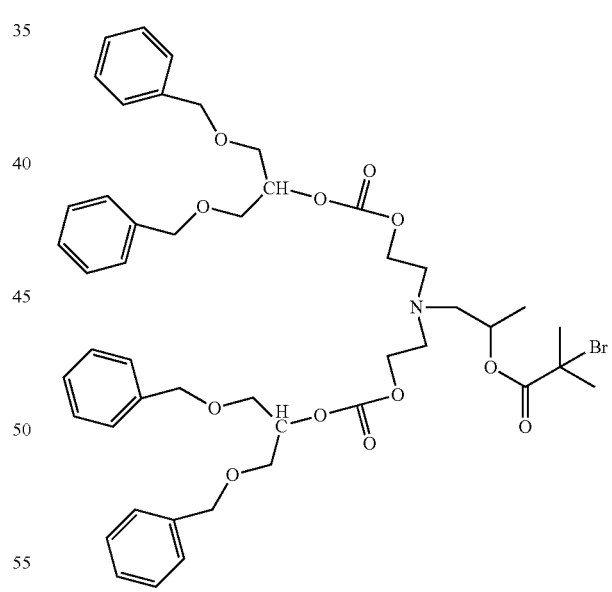

Mn=31,200; Mw=106,100 PDI=3.4

The invention claimed is:

1. A method of preparing a non-gelled branched vinyl polymer carrying dendrons comprising: chain-growth polymerizing a predominant amount of a monofunctional vinyl monomer in the presence of a difunctional vinyl monomer and dendron units.

2. A method as claimed in claim 1, wherein the amount of difunctional vinyl monomer relative to monofunctional vinyl monomer is 2 mol % or less.

3. A method as claimed in claim 1, wherein the dendron units are present in an initiator.

4. A method as claimed in claim 1, wherein the dendron units are present in a chain transfer agent.

5. A method as claimed in claim 1, wherein the dendron units are present in the monofunctional vinyl monomer.

6. A method as claimed in claim 1, wherein the chain-growth polymerizing is effected by Atom Transfer Radical Polymerization (ATRP).

7. A method as claimed in claim 1, wherein the monofunctional vinyl monomer is 2-hydroxypropyl methacrylate.

8. A method as claimed in claim 1, wherein the difunctional vinyl monomer is ethyleneglycol dimethacrylate.

9. A method as claimed in claim 3, wherein the initiator is selected from the group consisting of:

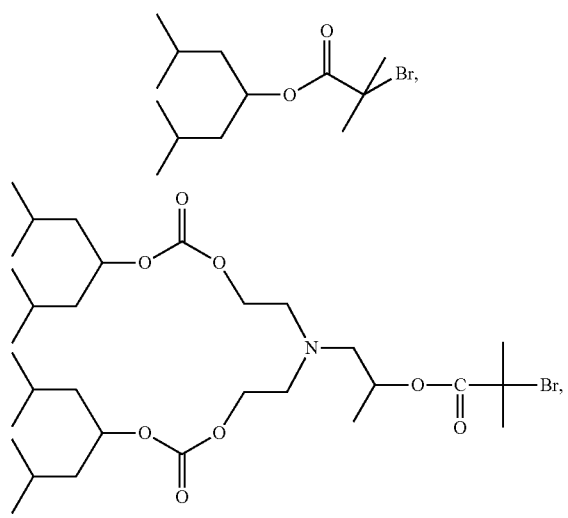

-continued

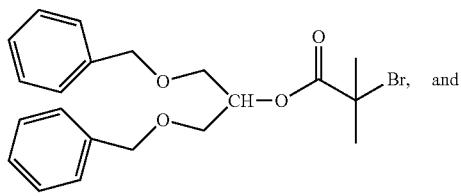

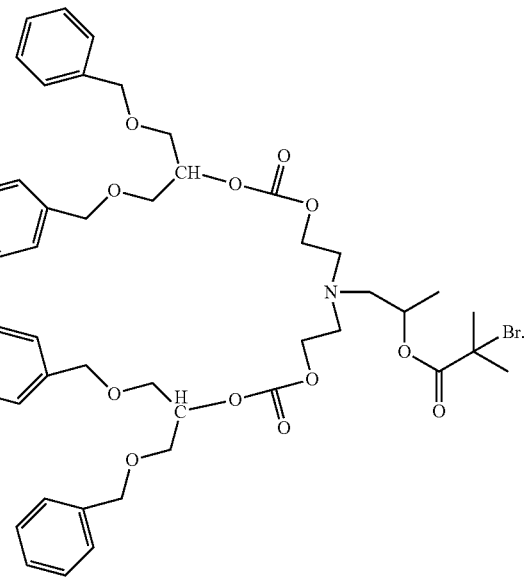

* * * * *